(12) United States Patent
Yu

(10) Patent No.: US 12,497,495 B2
(45) Date of Patent: Dec. 16, 2025

(54) CORE FLOORING LAYER OF A LIGHT-FOAMED SPC FLOOR AND A LIGHT-FOAMED SPC FLOOR

(71) Applicant: ANHUI OMI VINYL CO., LTD., Xuancheng (CN)

(72) Inventor: Min Yu, Xuancheng (CN)

(73) Assignee: ANHUI OMI VINYL CO., LTD., Xuancheng (CN)

( * ) Notice: Subject to any disclaimer, the term of this patent is extended or adjusted under 35 U.S.C. 154(b) by 177 days.

(21) Appl. No.: 18/540,886

(22) Filed: Dec. 15, 2023

(65) Prior Publication Data

US 2024/0132688 A1    Apr. 25, 2024

(30) Foreign Application Priority Data

Jan. 9, 2023    (CN) .......................... 202310038454.7

(51) Int. Cl.
*C08J 9/00*      (2006.01)
*B32B 5/18*      (2006.01)
(Continued)

(52) U.S. Cl.
CPC ............... *C08J 9/0066* (2013.01); *B32B 5/18* (2013.01); *B32B 27/065* (2013.01); *B32B 27/20* (2013.01);
(Continued)

(58) Field of Classification Search
CPC .... A45D 34/04; A45D 34/046; B32B 27/065; B32B 27/18; B32B 27/20; B32B 27/22; B32B 27/304; B32B 5/18; B32B 5/245; C08J 2327/06; C08J 9/0023; C08J 9/0052; C08J 9/0066; C08J 9/08; C08J 9/103; C08J 9/105; C08K 2003/265; C08K 3/26; C08K 5/0016; C08K 5/098; C08K 5/12; E04F 15/105; E04F 15/107
See application file for complete search history.

(56) References Cited

U.S. PATENT DOCUMENTS

| | | | |
|---|---|---|---|
| 2019/0001543 A1* | 1/2019 | Dai ........................ | E04F 15/107 |
| 2022/0203664 A1* | 6/2022 | Song ....................... | C08L 27/06 |
| 2023/0203664 A1* | 6/2023 | Saito ....................... | C23C 18/36 |
| | | | 427/304 |

FOREIGN PATENT DOCUMENTS

CN    112895642 A    *    6/2021    ............. E04F 15/18

OTHER PUBLICATIONS

Translation of CN112895642A, Chen et al., Jun. 4, 2021. (Year: 2021).*

* cited by examiner

*Primary Examiner* — Hai Vo
(74) *Attorney, Agent, or Firm* — Kilpatrick Townsend & Stockton LLP

(57) ABSTRACT

Provided in the present disclosure are a core flooring layer of a light-foamed SPC floor and a light-foamed SPC floor. Based on the total weight of the core flooring, the core flooring of the present disclosure contains 65.0~75.0 wt % of calcium carbonate, 18.0~25.0 wt % of polyvinyl chloride resin, 2.2~3.0 wt % of a foaming regulator, 2.5~3.3 wt % of a stabilizer, 0.10~0.20 wt % of a plasticizer, 0.10~0.15 wt % of an external lubricant, 0.1~0.40 wt % of an ADC foaming agent, and 0.5~1.0 wt % of an NC foaming agent. The present disclosure can greatly reduce the density of a SPC floor while improving the static bending strength, flexural elastic modulus and peeling strength, and reducing heating warpage.

14 Claims, 1 Drawing Sheet

(51) Int. Cl.
  *B32B 27/06* (2006.01)
  *B32B 27/20* (2006.01)
  *B32B 27/30* (2006.01)
  *C08J 9/08* (2006.01)
  *C08J 9/10* (2006.01)
  *C08K 3/26* (2006.01)
  *E04F 15/10* (2006.01)

(52) U.S. Cl.
  CPC ............ *B32B 27/304* (2013.01); *C08J 9/0052* (2013.01); *C08J 9/08* (2013.01); *C08J 9/103* (2013.01); *C08J 9/105* (2013.01); *E04F 15/105* (2013.01); *E04F 15/107* (2013.01); *C08J 2327/06* (2013.01); *C08K 2003/265* (2013.01)

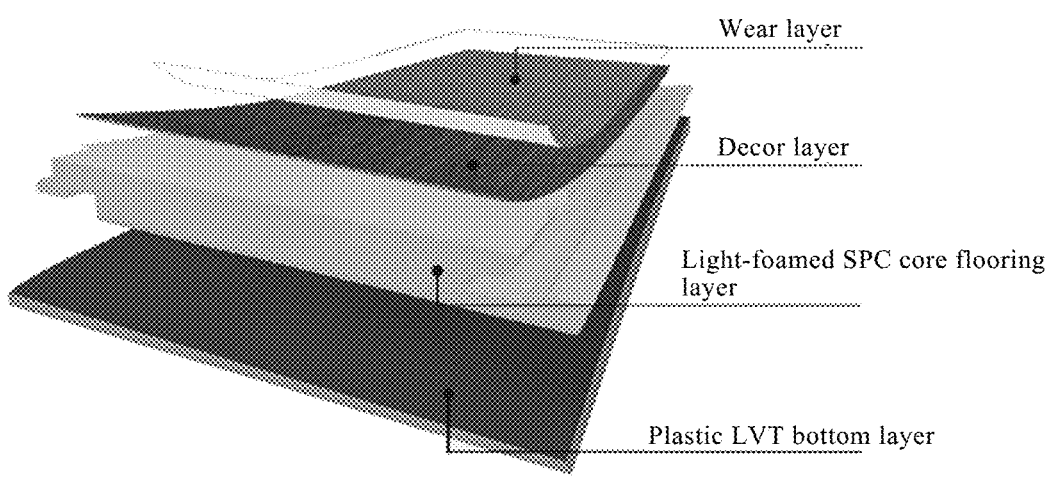

CORE FLOORING LAYER OF A LIGHT-FOAMED SPC FLOOR AND A LIGHT-FOAMED SPC FLOOR

BACKGROUND

SPC (stone plastic composite) floor, also known as stone plastic floor, is a floor made of calcium powder as raw material and subjected to compression and plasticization, which is characterized by a core usually composed of calcium carbonate (limestone), polyvinyl chloride and plasticizers. It is designed to exactly replicate traditional flooring materials such as stone, ceramic or wood.

The existing SPC floor has the problems of high density and poor heating warpage performance. For example, US 20190316364A1 discloses a composite board having a SPC stone plastic floor as a core flooring layer. Its density is relatively high at 1.9-2 t/m$^3$ (i.e. 1.9-2 g/cm$^3$). The heavy weight per unit area during the decoration process will also increase transportation costs. CN114953668A discloses a PVC light-foamed stone plastic floor. Although the floor density is reduced to 1.65-1.71 g/cm$^3$, its heating warpage is 0.56-0.73 mm.

Therefore, there is still a need in this field for light-foamed SPC floors with low density and better mechanical properties.

SUMMARY OF THE DISCLOSURE

The present disclosure relates a core flooring used as a core flooring layer of light-foamed SPC floor, and the core flooring contains 65.0~75.0 wt % of calcium carbonate, 18.0~25.0 wt % of polyvinyl chloride resin, 2.2~3.0 wt % of a foaming regulator, 2.5~3.3 wt % of a stabilizer, 0.10~0.20 wt % of a plasticizer, 0.10~0.15 wt % of an external lubricant, 0.1~0.40 wt % of an ADC foaming agent, and 0.5~1.0 wt % of an NC foaming agent based on the total weight of the core flooring; and the core flooring does not contain a separately added internal lubricant; and the calcium carbonate contains 10~13 wt % of 700-800 mesh calcium carbonate and 57~62 wt % of 300-500 mesh, preferably 350-500 mesh, calcium carbonate based on the total weight of the core flooring.

In one or more embodiments, the core flooring contains 10~13 wt % of 800 mesh calcium carbonate and 57~62 wt % of 350 mesh calcium carbonate based on the total weight of the core flooring.

In one or more embodiments, the content of polyvinyl chloride is 19~24.5 wt %, such as 19~21 wt % or 23.5~24.5 wt %, based on the total weight of the core flooring.

In one or more embodiments, the foaming regulator is a PVC foaming regulator, such as an acrylic processing aid; preferably, the content of the foaming regulator is 2.4~3.0 wt % based on the total weight of the core flooring.

In one or more embodiments, the stabilizer is selected from one or more of metal soap stabilizers, composite stabilizers, and organic tin stabilizers; preferably, the stabilizer is a calcium zinc stabilizer, such as one or a combination of calcium stearate and zinc stearate; preferably, the content of the stabilizer is 2.6~3.2 wt % based on the total weight of the core flooring.

In one or more embodiments, the external lubricant is selected from one or more of PE wax or oxidized polyethylene wax; preferably, the content of the external lubricant is 0.10~0.15 wt %, such as 0.10~0.13% based on the total weight of the core flooring.

In one or more embodiments, the plasticizer is oxidized polyethylene wax; preferably, the content of the plasticizer is 0.15~0.18 wt % based on the total weight of the core flooring.

In one or more embodiments, based on the total weight of the NC foaming agent, it comprises sodium bicarbonate in a content of 50~70 wt %, zinc stearate in a content of 5~15 wt %, p-toluenesulfonyl semicarbazide in a content of 5~15 wt %, silicon dioxide in a content of 5~15 wt %, magnesium stearate in a content of 5~10 wt %, and sodium acetate in a content of 2~3 wt %.

In one or more embodiments, based on the total weight of the ADC foaming agent, it comprises azodicarbonamide in a content of 99.4~99.8 wt %, urea in a content of 0.1~0.3 wt %, polyacrylamide in a content of 0.1~0.2 wt %, and sodium cyanate in a content of 0.04~0.07 wt %.

In one or more embodiments, the content of NC foaming agent is 0.50~0.70 wt %, and the content of ADC foaming agent is 0.15~0.30 wt % based on the total weight of the core flooring.

In one or more embodiments, the core flooring also contains one or more of colorants, reinforcing materials and flame retardants; preferably, the colorant is carbon black; preferably, the reinforcing material is selected from one or more of glass fiber, carbon fiber and nanocarbon fiber; the flame retardant is selected from one or more of phosphite flame retardants and perfluorobutane sulfonate flame retardants.

In one or more embodiments, the content of colorants is 0.01~0.2 wt %, based on the total weight of the core flooring.

In one or more embodiments, based on the total weight of the core flooring, the core flooring contains 10~12 wt % of 800 mesh calcium carbonate, 57~59 wt % of 350 mesh calcium carbonate, 23~24.5 wt % of PVC resin powder, 2.8~3.1 wt % of the foaming regulator, 2.9~3.2 wt % of the stabilizer, 0.15~0.18 wt % of the plasticizer, 0.10~0.15 wt % of the external lubricant, 0.15~0.25 wt % of the ADC foaming agent, and 0.50~0.60 wt % of the NC foaming agent; and the core flooring does not have a separately added internal lubricant.

In one or more embodiments, based on the total weight of the core flooring, the core flooring contains 11~13 wt % of 800 mesh calcium carbonate, 60~62 wt % of 350 mesh calcium carbonate, 18~20 wt % of PVC resin powder, 2.3~2.7 wt % of the foaming regulator, 2.6~2.8 wt % of the stabilizer, 0.15~0.18 wt % of the plasticizer, 0.10~0.15 wt % of the external lubricant, 0.13~0.29 wt % of the ADC foaming agent, and 0.54~0.70 wt % of the NC foaming agent; and the core flooring does not have a separately added internal lubricant.

The present disclosure also provides a method of preparing the core flooring in any embodiment as described herein, comprising:
  (1) Mixing: each material is weighed according to the content in the composition of the core flooring in any embodiment as described herein, put into a mixer, stirred until the temperature is 110 to 130° C., to obtain a mixture; and
  (2) Extrusion: the mixture obtained in step (1) is transported to an extruder for extrusion processing;
  (3) Fixed thickness molding: a board coming out of a die head is molded to a fixed thickness to obtain the core flooring.

In one or more embodiments, the extruder in step (2) adopts a counter-rotating cone twin-screw design.

In some embodiments, the temperature of the extruder is set as follows: 190~225° C. in Barrel zone 1, 190~225° C. in Barrel zone 2, 190~225° C. in Barrel zone 3, 190~225° C. in Barrel zone 4, 200~220° C. in Barrel zone 5, 200~220° C. in Barrel zone 6, 160~180° C. in a converging core; and the inner diameter of the converging core is 80~90 mm.

In one or more embodiments, the die head adopts a T-type die head, and the temperature is set as follows: 190~210° C. in Zone 1, 190~210° C. in Zone 2, 190~210° C. in Zone 3, 190~210° C. in Zone 4, and 190~210° C. in Zone 5.

The present disclosure also provides a light-foamed SPC floor, which contains the core flooring in any embodiment as described herein as a core flooring layer. Preferably, the light-foamed SPC floor also comprises a wear layer and a decor layer. Preferably, the bottom layer of the light-foamed SPC floor is provided with a balancing layer, and a plastic LVT layer is used as the balancing layer. Preferably, the light-foamed SPC floor also includes a UV coating. Preferably, a UV coating is provided on the surface of the wear layer.

In one or more embodiments, based on the total weight of the plastic LVT bottom layer, the plastic LVT bottom layer contains 43~48 wt % of PVC resin, 43~48 wt % of calcium carbonate (e.g. 300~500 mesh calcium carbonate), 1.0~1.5 wt % of a stabilizer (such as the stabilizer as set forth, preferably calcium zinc stabilizers), 7~9 wt % of a plasticizer (e.g. DOTP), 0.10~0.20% of an external lubricant (e.g. PE wax), and 0.01~0.10% of a colorant such as carbon black.

In one or more embodiments, based on the total weight of the plastic LVT bottom layer, the plastic LVT bottom layer contains 44~46 wt % of PVC resin, 44~46 wt % of calcium carbonate (e.g. 300~500 mesh calcium carbonate), 1.0~1.5 wt % of a stabilizer (such as the stabilizer as set forth, preferably calcium zinc stabilizers), 7.5~8.6 wt % of a plasticizer (e.g. DOTP), 0.10~0.20% of an external lubricant (e.g. PE wax), and 0.01~0.06% of a colorant such as carbon black.

In one or more embodiments, the method includes: (A) Lamination: the wear layer, the decor layer and the balancing layer are laminated on the core flooring layer for pre-lamination, and heated to complete the lamination; (B) Coating: a product obtained after lamination is coated with a UV-paint roll coater, and the UV paint is cured by a UV lamp; (C) Grooving and molding: a shaped product obtained in step (B) is divided into pieces according to the width and grooved to obtain the light-foamed SPC floor.

In one or more embodiments, the method further includes the step of preparing the core flooring layer using the method of preparing the core flooring.

DESCRIPTION OF FIGURES

The FIGURE is a structural schematic diagram of the SPC product of the present disclosure.

DETAILED DESCRIPTION

The following general description and definition of terms and words mentioned in the specification and claims are provided. Unless otherwise specified, all technical and scientific terms used herein are intended to be the ordinary meaning of the present disclosure and in case of a conflict, the definition of this specification shall prevail.

The theories or mechanisms described and disclosed herein, whether right or wrong, should not limit the scope of the present disclosure in any way. That is, the present disclosure can be practiced without being limited to any particular theory or mechanism.

In the present disclosure, the terms "consisting essentially of" and "consisting of" are encompassed by "comprising", "including", "containing" and similar terms. For example, when "A comprises B and C" is disclosed herein, "A substantially consists of B and C" and "A consists of B and C" should be considered to have been disclosed herein.

In the present disclosure, all features, such as numerical values, quantities, amounts and concentrations, which are defined by numerical ranges or percentage ranges, are only for the sake of simplicity and convenience. Accordingly, the recitation of numerical ranges or percentage ranges shall be construed as covering and specifically disclosing all possible sub-ranges and individual values (including integers and fractions) in the range.

In the present disclosure, unless otherwise specified, a percentage is a mass percentage, and a ratio is a mass ratio.

In the present disclosure, when embodiments or examples are described, it should be understood that they are not intended to limit the present disclosure to these embodiments or examples. On the contrary, all alternatives, improvements and equivalents of the methods and materials described in the present disclosure can be covered within the scope defined by the claims.

Herein, for the sake of brevity of description, not all possible combinations of various features in the various embodiments or examples are described. Therefore, as long as there is no contradiction in the combination of these features, the various features in the various embodiments or examples can be combined in any combination, and all possible combinations should be considered to be within the scope of this specification.

The inventor found that when more calcium powder is added, using the composite flooring formulation of the present disclosure, the density of SPC floor can be greatly reduced while the static bending strength, bending elastic modulus and peel strength are improved, and heating warpage is reduced by adjusting the combination and the amount of additives (lubricants, regulators, plasticizers and foaming agents).

Therefore, the present disclosure provides a core flooring used as a core flooring layer of a light-foamed SPC floor, and based on the total weight of the core flooring, the core flooring contains 65.0~75.0 wt % of calcium carbonate, 18.0~25.0 wt % of polyvinyl chloride resin, 2.2~3.0 wt % of a foaming regulator, 2.5~3.3 wt % of a stabilizer, 0.10~0.20 wt % of a plasticizer, 0.10~0.15 wt % of an external lubricant, 0.1~0.40 wt % of an ADC foaming agent, and 0.5~1.0 wt % of a NC foaming agent.

Herein, calcium carbonate (also called stone powder) can be obtained from commercial sources. In the light-foamed SPC floor, the use of a single stone powder can easily lead to unstable current during the preparation process, uneven processing thickness, low foaming volume, high density, and brittleness of the core flooring. For example, using a single 800-mesh calcium carbonate will cause screw feeding failure, and using a single 350-mesh calcium carbonate will cause uneven foaming. Therefore, preferably, calcium carbonate powder having two or more particle size ranges is used. The particle size of calcium carbonate powder having two or more particle size ranges is preferably within the range of 300-800 mesh. More preferably, the calcium carbonate powder used herein is composed of 700-800 mesh calcium carbonate powder and 350-500 mesh calcium carbonate powder. Based on the total weight of the core flooring layer of the light-foamed SPC floor, the total content of calcium carbonate can be 67~75 wt %, such as 67~70 wt %. In some embodiments, the core flooring layer contains 10~13 wt % of 800 mesh calcium carbonate and 57~62 wt % of 300 mesh calcium carbonate based on the total weight of the core flooring layer. In some embodiments, the core flooring layer contains 10~13 wt % of 800 mesh calcium carbonate and 57~62 wt % of 350 mesh calcium carbonate based on the total weight of the core flooring layer.

Herein, polyvinyl chloride can be conventional polyvinyl chloride used in the art for the SPC core flooring layer. For example, polyvinyl chloride resin with a polymerization degree of 800 to 1000 or any mixture thereof can be used. Polyvinyl chloride used in the present disclosure can be purchased from commercial sources. In some embodiments, polyvinyl chloride can be used in powder form, that is, in the form of polyvinyl chloride resin powder. The content of polyvinyl chloride is 19~24.5 wt % based on the total weight of the core flooring layer of the light-foamed SPC floor, such as 19~21 wt % or 23.5~24.5 wt %.

Herein, the foaming regulator may be a PVC foaming regulator well known in the art, such as an acrylic processing aid. In some embodiments, the foaming regulator is a copolymer of methyl methacrylate and acrylate, or a blend of polymethyl methacrylate and acrylate. The content of the foaming regulator can be adjusted according to the content of the foaming agent, and conventional foaming regulators in this field can be used. Based on the total weight of the core flooring layer of the light-foamed SPC floor, the content of the foaming regulator can be 2.4~3.0 wt %.

Herein, the stabilizer can be a stabilizer well known in the art, including but not limited to one or more of metal soap stabilizers, composite stabilizers, and organotin stabilizers. In some embodiments, the stabilizer is a calcium zinc stabilizer, such as one or a combination of calcium stearate and zinc stearate. Herein, based on the total weight of the core flooring layer of the light-foamed SPC floor, the content of the stabilizer can be 2.6~3.2 wt %.

Lubricants usually added to the SPC core flooring layer include internal lubricants and external lubricants. The external lubricant includes one or more of PE wax or oxidized polyethylene wax. The internal lubricant includes one or more of stearic acid or modified stearic acid. It is generally believed that external lubricants have poor compatibility with polymers, and can improve the friction between the polymer melt and the hot metal surface of the processing equipment. External lubricants can easily migrate outward from the melt and form a lubricating film at the interface between the plastic melt and the metal. Internal lubricants have good compatibility with the polymer, plays a role in reducing the cohesion of the polymer molecules inside the polymer, and improves the internal friction heat generation of the plastic melt and the fluidity of the melt. The present disclosure found that the effect of significantly reducing density and significantly improving mechanical properties can be achieved by using a smaller amount of external lubricant without adding additional or separate internal lubricants in the present disclosure. In some embodiments, the added amount of the separate internal lubricant is 0, and the content of the external lubricant is 0.10~0.15 wt %, such as 0.10~0.13%.

The present disclosure found that using a single NC foaming agent will cause no foaming in the core flooring layer. Using a combination of an NC foaming agent and an ADC foaming agent, combined with a combination of calcium powder in different mesh ranges, it is possible to significantly reduce the density of the SPC core flooring board and significantly improve the mechanical properties of light-foamed SPC floor, even if no internal lubricants and lower the amount of foaming regulators are used. Therefore, the foaming agent herein is a combination of the NC foaming agent and the ADC foaming agent.

Herein, the NC foaming agent is also called white foaming agent, and its main component is sodium bicarbonate. The NC foaming agents suitable for the present disclosure contain sodium bicarbonate, zinc stearate, p-toluenesulfonyl semicarbazide, silicon dioxide, magnesium stearate and sodium acetate. In an exemplary embodiment, based on the total weight of the NC foaming agent, it may comprise sodium bicarbonate in a content of 50~70 wt %, zinc stearate in a content of 5~15 wt %, p-toluenesulfonyl semicarbazide in a content of 5~15 wt %, silicon dioxide in a content of 5~15 wt %, magnesium stearate in a content of 5~10 wt %, and sodium acetate in a content of 2~3 wt %. Various commercially available NC foaming agents can be used to implement the present disclosure.

Herein, the ADC foaming agent is also called yellow foaming agent, and its main component is azodicarbonamide. In an exemplary embodiment, based on the total weight of the ADC foaming agent, it may comprise azodicarbonamide in a content of 99.4~99.8 wt %, urea in a content of 0.1~0.3 wt %, polyacrylamide in a content of 0.1~0.2 wt %, and sodium cyanate in a content of 0.04~0.07 wt %. Commercially available ADC foaming agents can be used to implement the present disclosure.

Herein, based on the total weight of the core flooring layer, the content of the NC foaming agent is 0.5~1.0 wt %, preferably 0.50~0.70 wt %; the content of the ADC foaming agent is 0.1~0.40 wt %, preferably 0.15~0.30 wt %.

Here, the plasticizer may be a plasticizer well known in the art, such as oxidized polyethylene wax, especially high-density oxidized polyethylene wax. Commercially available plasticizers can be used to implement the present disclosure. Herein, based on the total weight of the core flooring, the content of the plasticizer can be 0.1~0.2 wt %.

The core flooring used in the core flooring layer of the light-foamed SPC floor as described herein can also contain other additives commonly used in light-foamed SPC core flooring layers, such as colorants (e.g. carbon black, etc.), reinforced materials (e.g. glass fiber, carbon fiber or nano-carbon fiber), and flame retardants (e.g. phosphites and perfluorobutane sulfonates). These additives are used in the core flooring layers of the present disclosure in their customary amounts. For example, the content of the colorant is 0.01~0.10 wt % based on the total weight of the core flooring layer.

In some embodiments, based on the total weight of the core flooring, the core flooring used as the core flooring layer of the light-foamed SPC floor described herein contains 10~12 wt % of 800 mesh calcium carbonate, 57~59 wt % of 350 mesh calcium carbonate, 23~24.5 wt % of PVC resin powder, 2.8~3.1 wt % of the foaming regulator, 2.9~3.2 wt % of the stabilizer, 0.15~0.18 wt % of the plasticizer, 0.10~0.15 wt % of the external lubricant, 0.15~0.25 wt % of the ADC foaming agent, and 0.50~0.60 wt % of the NC foaming agent; and the core flooring does not have a separately added internal lubricant.

In some embodiments, based on the total weight of the core flooring, the core flooring used as the core flooring layer of the light-foamed SPC floor described herein contains 11~13 wt % of 800 mesh calcium carbonate, 60~62 wt % of 350 mesh calcium carbonate, 18~20 wt % of PVC resin powder, 2.3~2.7 wt % of the foaming regulator, 2.6~2.8 wt % of the stabilizer, 0.15~0.18 wt % of the plasticizer, 0.10~0.15 wt % of the external lubricant, 0.13~0.29 wt % of the ADC foaming agent, and 0.54~0.70 wt % of the NC foaming agent; and the core flooring does not have a separately added internal lubricant.

The core flooring layer of a light-foamed SPC floor in the present disclosure can be prepared by the following method:
(1) Mixing: each material is weighed according to the content in the composition of the core flooring in any embodiment as described herein, put into a mixer, stirred until the temperature is 110 to 130° C., to obtain a mixture; and
(2) Extrusion: the mixture obtained in step (1) is transported to an extruder for extrusion processing;
(3) Fixed thickness molding: a board coming out of a die head is molded to a fixed thickness to obtain the core flooring.

In some embodiments, the extruder in step (2) adopts a counter-rotating cone twin-screw design.

In some embodiments, the temperature of the extruder is set as follows: 190~225° C. in Barrel zone 1, 190~225° C. in Barrel zone 2, 190~225° C. in Barrel zone 3, 190~225° C. in Barrel zone 4, 200~220° C. in Barrel zone 5, 200~220° C. in Barrel zone 6, 160~180° C. in a converging core. The inner diameter of the converging core is 80~90 mm.

In some embodiments, the die head adopts a T-type die head, and the temperature is set as follows: 190~210° C. in Zone 1, 190~210° C. in Zone 2, 190~210° C. in Zone 3, 190~210° C. in Zone 4, and 190~210° C. in Zone 5.

In some embodiments, the present disclosure provides a light-foamed SPC floor, which contains the core flooring as described in any embodiment herein as a core flooring layer. The light-foamed SPC floor can also include a wear layer and a colorful (film) layer (also called a decor layer). In some embodiments, the bottom layer of the light-foamed SPC floor of the present disclosure is provided with a balancing layer, and a plastic LVT layer can be used as the balancing layer. In some embodiments, the structure of the light-foamed SPC floor of the present disclosure is shown in the FIGURE. From top to bottom, there is a wear layer, a colorful (film) layer, a light-foamed SPC core flooring layer and a plastic LVT bottom layer.

There is no special restriction on the wear layer, the colorful (film) layer and the plastic LVT bottom layer used in the present disclosure. The wear layer, the colorful (film) layer and the plastic LVT bottom layer commonly used in this field can be used in the present disclosure.

In some embodiments, based on the total weight of the plastic LVT bottom layer, the plastic LVT bottom layer contains 43~48 wt % of PVC resin, 43~48 wt % of calcium carbonate (e.g. 300~500 mesh calcium carbonate), 1.0~1.5 wt % of a stabilizer (such as the stabilizer as set forth, preferably calcium zinc stabilizers), 7~9 wt % of a plasticizer (e.g. DOTP), 0.10~0.20% of an external lubricant (e.g. PE wax), and 0.01~0.10% of a colorant such as carbon black. In some embodiments, based on the total weight of the plastic LVT bottom layer, the plastic LVT bottom layer contains 44~46 wt % of PVC resin, 44~46 wt % of calcium carbonate (e.g. 300~350 mesh calcium carbonate), 1.0~1.5 wt % of a stabilizer (such as the stabilizer as set forth, preferably calcium zinc stabilizers), 7.5~8.6 wt % of a plasticizer (e.g. DOTP), 0.10~0.20% of an external lubricant (e.g. PE wax), and 0.01~0.06% of a colorant such as carbon black.

The plastic LVT bottom layer can be prepared by the following method: each raw material is put into a mixer, stirred evenly to obtain a mixture; the mixture is added to the feeding port of the extruder, and the extruder adopts counter-rotating cone twin-screw design and the temperature of the extruder is set as follows: 215~235° C. in Barrel zone 1, 215~235° C. in Barrel zone 2, 215~235° C. in Barrel zone 3, 215~235° C. in Barrel zone 4, 225~245° C. in Barrel zone 5, 225~245° C. in Barrel zone 6, 225~245° C. in Barrel zone 7, 225~245° C. in Barrel zone 8; the base material extruded from the barrel is transported to the open mill roller for plasticization, and the roller temperature is set to 180~200° C.; the plasticized base material is transported to the calendaring roller for fixed thickness shaping, and the roller temperature is set to 120~140° C.; the shaped base material is pulled to the cooling roller; after cooling and molding is completed, the plastic LVT bottom layer can be obtained.

In some embodiments, the light-foamed SPC floor of the present disclosure also includes a UV coating layer. For example, a UV layer is provided on the surface of the wear layer.

The light-foamed SPC floor of the present disclosure can be prepared by a method including the following steps: (A) lamination: the wear layer, the decor layer and the balancing layer are laminated on the core flooring layer for pre-lamination, and heated to complete the lamination; (B) coating: using a product obtained after lamination is coated with a UV-paint roll coater, and the UV paint is cured by a UV lamp; (C) grooving and molding: a shaped product obtained in step (B) is divided into pieces according to the width and grooved to obtain the light-foamed SPC floor. In some embodiments, the method further includes the step of preparing the core flooring layer using the method described above.

In some embodiments, during the lamination step, the balancing layer can be heated until it softens and becomes sticky, and then laminated to the board. In some embodiments, the heating temperature can be 150~200° C.

The present disclosure will be further described below in the form of specific examples. It should be understood that these examples are merely illustrative and are not intended to limit the scope of the present disclosure. Unless otherwise specified, the methods and reagents used in the examples are conventional methods and reagents in the art.

Material 800 mesh calcium carbonate: Asmematerial, Jingxian County;
350 mesh calcium carbonate: Asmematerial, Jingxian County;
Resin powder type 5: Hwasu SG-5, Anhui;
Regulator: Maijisen K400, Kunshan;
Stabilizer: Senjike W100, Jiangsu;
Internal lubricant: Union H60, Kunshan;
Plasticizer: Maijisen 3316F, Kunshan;
External lubricant: PE wax, Weiqiang, Jiangsu;
Yellow foaming agent: Maijisen, Kunshan;
White foaming agent: Maijisen, Kunshan;
Carbon black: Kexing, Wuxi;
Wear layer: Yingtai, Jiangsu;
Decor layer: Yunjia, Hangzhou.

Methods of Detection

Herein, the testing method for density of each example and comparative example is ISO 23997, the testing method for static bending strength is ISO 4344 MOR, the testing method for heating warpage is EN434, the testing method for bending elastic modulus is ISO 24344 MOE, and the testing method for peeling strength is EN431.

Example 1

The core flooring used in the core flooring layer for the light-foamed SPC floor of each example and comparative example was prepared according to the formulation in Table 1 below. The preparing method included:

Each raw material was put into a high-speed mixer and stirred until the stirring temperature reached 120° C., and the materials were transferred to the middle barrel for storage. The mixed materials were added to the feeding port of the extruder. The extruder adopted a counter-rotating cone twin-screw design. The temperature was set as follows: 190~225° C. in Barrel zone 1, 190~225° C. in Barrel zone 2, 190~225° C. in Barrel zone 3, 190~225° C. in Barrel zone 4, 200~220° C. in Barrel zone 5, 200~220° C. in Barrel zone 6, and 160~180° C. in a converging core. The inner diameter of the converging core was 80~90 mm.

The die head adopted a T-type die head, and the temperature was set as follows: 190~210° C. in Zone 1, 190~210° C. in Zone 2, 190~210° C. in Zone 3, 190~210° C. in Zone 4, and 190~210° C. in Zone 5.

The board coming out of the die head was molded to a fixed thickness by twin steel roller to obtain the light-foamed SPC core flooring.

TABLE 2

| Example/Comparative Example | Molding quality evaluation | Density (g/cm$^3$) | Note |
|---|---|---|---|
| Example 1 | A1 | 1.52 | |
| Example 2 | A1 | 1.67 | |
| Comparative Example 1 | A3 | / | Unstable current, failure of screw feeding |
| Comparative Example 2 | A2 | 1.52 | Obvious horizontal bars on the surface |
| Comparative Example 3 | A1 | 2.0 | No foaming, similar to SPC floor |
| Comparative Example 4 | A2 | 1.9 | Obvious bubbles. |
| Comparative Example 5 | A2 | 1.45 | Obvious bubbles |
| Comparative Example 6 | A2 | 1.75 | Unstable current and uneven foaming |
| Comparative Example 7 | / | 1.65 | |
| Comparative Example 8 | / | 1.71 | |
| Comparative Example 10 | A2 | 1.86 | More obvious bubbles |

TABLE 1

Formulations of examples and comparative examples

| Raw material name | Example 1 | Example 2 | Comparative Example 1 | Comparative Example 2 | Comparative Example 3 | Comparative Example 4 | Comparative Example 5 | Comparative Example 6 | Comparative Example 7 | Comparative Example 8 | Comparative Example 10 |
|---|---|---|---|---|---|---|---|---|---|---|---|
| 800 mesh calcium carbonate | 10.55% | 12.64% | 69.37% | 15.94% | 16.01% | 16.08% | 16.05% | / | 23%* | / | 10.56% |
| 350 mesh calcium carbonate | 58.08% | 61.51% | / | 53.13% | 53.36% | 53.59% | 53.50% | 69.38% | 46.17%* | 68.64%* | 58.08% |
| Resin powder type 5 | 24.29% | 19.38% | 24.55% | 24.44% | 24.55% | 24.65% | 24.61% | 24.55% | 21.64% | 21.45% | 24.29% |
| Foaming regulator | 2.96% | 2.53% | 1.92% | 1.91% | 1.92% | 1.93% | 1.93% | 1.92% | 5.20% | 5.15% | 2.96% |
| Stabilizer | 3.06% | 2.70% | 3.10% | 3.09% | 3.09% | 3.11% | 3.10% | 3.09% | 2.20% | 2.15% | 3.06% |
| Internal lubricant | / | / | / | 0.43% | / | / | / | / | 0.35% | 0.39% | 0.00% |
| Plasticizer | 0.17% | 0.15% | 0.17% | 0.17% | 0.17% | 10.17% | 0.17% | 0.17% | 0.35% | 0.51% | 0.17% |
| External lubricant | 0.11% | 0.12% | 0.11% | 0.11% | 0.11% | 0.11% | 0.11% | 0.11% | 0.39% | 0.43% | 0.11% |
| Yellow foaming agent | 0.19% | 0.27% | 0.19% | 0.19% | / | 0.32% | 0.43% | 0.19% | 0.61% | 0.80% | 0.74% |
| White foaming agent | 0.55% | 0.67% | 0.55% | 0.55% | 0.75% | / | 0.06% | 0.55% | / | 0.39% | / |
| Carbon black | 0.04% | 0.03% | 0.04% | 0.04% | 0.04% | 0.04% | 0.04% | 0.04% | 0.09% | 0.09% | 10.04% |

*Note:
Comparative Example 7 used 600-mesh calcium carbonate and 325-mesh calcium carbonate, and Comparative Example 8 used 325-mesh calcium carbonate. The formulation and density data of Comparative Examples 7 and 8 were from CN114953668A.

The molding quality of the core flooring layers of each example and comparative example were evaluated according to the following standards: A1 means that there is little difference in appearance and no obvious defects: A2 means that the core flooring layers can basically be molded, but there are obvious defects in appearance, such as bubbles, horizontal bars, etc.; A3 means that the material cannot be extruded or cannot be basically molded. The results are shown in Table 2.

As can be seen from Table 2, Comparative Example 1 cannot be molded because of only using 800 mesh calcium carbonate powder, and therefore its density was not measured. Although Comparative Example 2 used NC and ADC foaming agents similar to those in the Examples of the present disclosure and used an internal lubricant, it could only be basically molded and there were obvious horizontal bars in the appearance, because the calcium carbonate used was not within the scope of the present disclosure. Comparative Example 4 did not use white foaming agents, and its calcium powder was not within the scope of the present disclosure, resulting in insufficient foaming and too high density of the core flooring. Although Comparative Example 5 had a lower density, it had obvious defects in its appearance, because the amount of the yellow foaming agent and the white foaming agent and the formulation of the calcium powder were not within the scope of the present disclosure; and the internal structure of the board was unstable due to the presence of bubbles in the structure. Comparative Example 6 used only one kind of calcium powder, and the result showed that it could only be basically molded, its appearance had obvious defects, and the internal structure of the board was unstable due to the presence of bubbles in the structure. Since comparative Example 10 used the yellow foaming agent in the total amount of yellow and white foaming agents of Example 1, more bubbles were generated on the surface of Comparative Example 10, and the defects were more obvious.

Among all comparative examples, only Comparative Example 3 could be molded normally. But because it did not use the yellow foaming agent, its density was extremely high.

Since the density of calcium carbonate is higher than that of resins, the density of the core flooring layer is mainly affected by the content of calcium carbonate. Generally, the higher the amount of calcium carbonate, the higher the density of the core flooring layer. The usage ratio of 800 mesh calcium carbonate to 350/300 mesh calcium carbonate has a negligible impact on the density of the end products, but it has a significant impact on the discharging speed and uniformity of end products. The amount of calcium carbonate used in Example 2 reached 74.15%, which reached the upper limit of the amount of calcium carbonate used in the light-foamed SPC core flooring layer. However, compared with Comparative Example 8 using only 68.64% calcium carbonate, the density of the core flooring layer in Example 2 still dropped from 1.71 g/cm$^3$ to 1.67 g/cm$^3$, indicating that the solution of the present disclosure can significantly reduce the density of the core flooring layer.

Example 2

According to the method of Example 1, the SPC core flooring layer of Comparative Example 9 was prepared according to the formulation shown in Table 3 below:

TABLE 3

| Raw material name | Amount (KG) |
| --- | --- |
| 500 mesh calcium carbonate | 325 |
| Resin powder type 5 | 100 |
| Stabilizer | 11 |
| Internal lubricant, G60 | 1.4 |
| External lubricant, PE wax | 0.8 |
| Plasticizer, 3316F | 0.4 |
| Carbon black | 0.5 |

The light-foamed SPC core flooring layers of Example 1 and Example 2, the core flooring layers of Comparative Examples 2~4, and the SPC core flooring layer of Comparative Example 9 were prepared into SPC Floors 1~6, and Comparative Examples 7, 8, and 10 were prepared into SPC Floors 7~9 with the following method:

Lamination: The wear layer, the decor layer and the plastic LVT bottom layer were controlled by the loading device respectively to control the tightness, and then entered into a pre-heating roller, and finally pre-laminated with the light-foamed SPC core flooring layers of Example 1 and Example 2, the core flooring layers of Comparative Example 2-4, and the core flooring layers of Comparative Example 9, respectively. After the pre-laminated products were infrared heated to 150~200° C., they entered an embossing roller to complete the lamination.

Coating: The laminated products were coated with a UV-paint roll coater, and the UV paint was cured through a UV lamp.

Grooving and molding: The shaped product was divided into pieces according to the width and grooved to obtain the light-foamed SPC floor.

The structures of the Floors 1~6 are shown in the FIGURE. The top layer is the wear layer, the second layer is the decor layer, the third layer is the core flooring layer, and the bottom layer is the plastic LVT bottom layer. The materials of the wear layer, the decor layer, and the bottom layer of Floors 1~6 were the same, and the only difference was that the core flooring layer was the core flooring layer of Example 1, Example 2, Comparative Examples 2~4, and Comparative Example 9, respectively.

The plastic LVT bottom layer was prepared by the following method: 45.17% of PVC resin (SG 5), 45.17% of 300 mesh calcium carbonate, 1.35% of powder calcium zinc stabilizer, 8.13% of DOTP, 0.14% of PE wax, and 0.04% of carbon black, based on the total weight of the mixture, were put into a high-speed mixer and stirred for 3 minutes. After the stirring was stopped, the materials were transferred to the middle barrel for storage. The mixtures were added to the feeding port of the extruder. The extruder adopted a counter-rotating cone twin-screw design. The temperature of the extruder was set as follows: 215~235° C. in Barrel zone 1, 215~235° C. in Barrel zone 2, 215~235° C. in Barrel zone 3, 215~235° C. in Barrel zone 4, 225~245° C. in Barrel zone 5, 225~245° °C. in Barrel zone 6, 225~245° C. in Barrel zone 7, and 225~245° C. in Barrel zone 8. The base materials extruded from the barrel were transported to the open mill roller for plasticization, and the roller temperature was set to 180-200° C. The plasticized base materials were conveyed to the calendaring roll for fixed thickness molding, and the roller temperature was set to 120-140° C., and the shaped base materials were pulled to the cooling roller. Molding was completed after cooling. The cooled base materials were pulled to a winding machine to obtain a coiled material, which was the plastic LVT bottom layer.

The density of the core flooring layer obtained in Comparative Example 9 was tested using the method described above and the density was 1.95 g/cm$^3$.

The static bending strength, heating warpage, flexural elastic modulus, and peeling strength of Floors 1~6 were tested. The results are shown in Table 4 to Table 6.

TABLE 4

| | Floor 1 | | Floor 2 | | Floor 6 | |
| --- | --- | --- | --- | --- | --- | --- |
| Core flooring layer | Example 1 | | Example 2 | | Comparative Example 9 | |
| Static bending strength (MPa) | 33.58 | | 29.67 | | 28.54 | |
| Heating warpage (80° C. × 6 h, mm) | +0.11 | −0.25 | +0.09 | −0.23 | +0.81 | −0.03 |
| | +0.10 | −0.43 | +0.11 | −0.33 | +0.88 | −0.01 |
| Flexural elastic modulus (MPa) | 7432.56 | | 6616.26 | | 4821.66 | |
| Peeling strength (N) | 112.25 | | 115.22 | | 109.28 | |

TABLE 5

|  | Floor 3 | | Floor 4 | | Floor 5 | |
| --- | --- | --- | --- | --- | --- | --- |
| Core flooring layer | Comparative Example 2 | | Comparative Example 3 | | Comparative Example 4 | |
| Static bending strength (MPa) | 23.37 | | 27.85 | | 25.09 | |
| Heating warpage (80° C. × 6 h, mm) | +0.14 +0.13 | −0.27 −0.44 | +0.23 +0.27 | −0.28 −0.54 | +0.12 +0.17 | −0.31 −0.52 |
| Flexural elastic modulus (MPa) | 5128.44 | | 5056.12 | | 4907.22 | |
| Peeling strength (N) | 102.26 | | 109.22 | | 110.36 | |

TABLE 6

|  | Floor 7 | | Floor 8 | | Floor 9 | |
| --- | --- | --- | --- | --- | --- | --- |
| Core flooring layer | Comparative Example 7 | | Comparative Example 8 | | Comparative Example 10 | |
| Static bending strength (MPa) | 13.52 | | 28.77 | | 23.67 | |
| Heating warpage (80° C. × 6 h, mm) | +0.17 +0.11 | −0.01 −0.02 | +0.13 +0.09 | −0.10 −0.07 | +0.19 +0.11 | −0.41 −0.37 |
| Flexural elastic modulus (MPa) | 4855.7 | | 5833.5 | | 4773.92 | |
| Peeling strength (N) | 97.4 | | 101.7 | | 100.06 | |

The above results show that under the condition that the other layers are consistent, the use of the light-foamed SPC core flooring layer of the present disclosure can significantly improve the static bending strength, the flexural elastic modulus, and the peeling strength of the floor and reduce the heating warpage of the floor, while significantly reducing the density.

What is claimed is:

1. A core flooring used as a core flooring layer of a light-foamed stone plastic composite (SPC) floor, wherein the core flooring contains, based on its total weight, 65.0-75.0 wt % of calcium carbonate, 18.0-25.0 wt % of polyvinyl chloride (PVC) resin powder, 2.2-3.0 wt % of a foaming regulator, 2.5-3.3 wt % of a stabilizer, 0.10-0.20 wt % of a plasticizer, 0.10-0.15 wt % of an external lubricant, 0.1-0.40 wt % of an ADC foaming agent, and 0.5-1.0 wt % of an NC foaming agent;
   wherein the core flooring does not contain a separately added internal lubricant;
   wherein the calcium carbonate contains, based on the total weight of the core flooring, 10-13 wt % of 700-800 mesh calcium carbonate and 57-62 wt % of 300-500 mesh,
   wherein the NC foaming agent comprises sodium bicarbonate in a content of 50-70 wt %, zinc stearate in a content of 5-15 wt %, p-toluenesulfonyl semicarbazide in a content of 5-15 wt %, silicon dioxide in a content of 5-15 wt %, magnesium stearate in a content of 5-10 wt %, and sodium acetate in a content of 2-3 wt %, based on the total weight of the NC foaming agent; and
   the ADC foaming agent comprises azodicarbonamide in a content of 99.4-99.8 wt %, urea in a content of 0.1-0.3 wt %, polyacrylamide in a content of 0.1-0.2 wt %, and sodium cyanate in a content of 0.04-0.07 wt %, based on the total weight of the ADC foaming agent.

2. The core flooring of claim 1, wherein:
   the foaming regulator is a PVC foaming regulator; and/or
   the stabilizer is selected from one or more of metal soap stabilizers, composite stabilizers, and organic tin stabilizers; and/or
   the external lubricant is selected from one or more of polyethylene (PE) wax or oxidized PE wax; and/or
   the plasticizer is oxidized PE wax.

3. The core flooring of claim 2, wherein:
   the foaming regulator is an acrylic processing aid; and/or
   the stabilizer is a calcium zinc stabilizer, or is calcium stearate or zinc stearate or a combination of calcium stearate and zinc stearate.

4. The core flooring of claim 1, wherein:
   the core flooring contains 10-13 wt % of 800 mesh calcium carbonate and 57-62 wt % of 350 mesh calcium carbonate based on the total weight of the core flooring; and/or
   the content of polyvinyl chloride is 19-24.5 wt %, 19-21 wt % or 23.5-24.5 wt %, based on the total weight of the core flooring; and/or
   the content of the foaming regulator is 2.4-3.0 wt % based on the total weight of the core flooring; and/or
   the content of the stabilizer is 2.6-3.2 wt % based on the total weight of the core flooring; and/or
   the content of the external lubricant is 0.10-0.15 wt % or 0.10-0.13 wt % based on the total weight of the core flooring; and/or
   the content of the plasticizer is 0.15-0.18 wt % based on the total weight of the core flooring.

5. The core flooring of claim 1, wherein the content of the NC foaming agent is 0.50-0.70 wt %, and the content of the ADC foaming agent is 0.15-0.30 wt %, based on the total weight of the core flooring.

6. The core flooring of claim 1, wherein the core flooring further contains one or more of colorants, reinforcing materials and flame retardants.

7. The core flooring of claim 6, wherein:
   the colorant is carbon black;
   the reinforcing material is selected from one or more of glass fiber, carbon fiber and nanocarbon fiber; and
   the flame retardant is selected from one or more of phosphite flame retardants and perfluorobutane sulfonate flame retardants.

8. The core flooring of claim 7, wherein the content of the colorant is 0.01-0.10 wt %, based on the total weight of the core flooring.

9. The core flooring of claim 1, wherein:
the core flooring contains 10-12 wt % of 800 mesh calcium carbonate, 57-59 wt % of 350 mesh calcium carbonate, 23-24.5 wt % of PVC resin powder, 2.8-3.1 wt % of the foaming regulator, 2.9-3.2 wt % of the stabilizer, 0.15-0.18 wt % of the plasticizer, 0.10-0.15 wt % of the external lubricant, 0.15-0.25 wt % of the ADC foaming agent, and 0.50-0.60 wt % of the NC foaming agent, based on the total weight of the core flooring; or the core flooring contains 11-13 wt % of 800 mesh calcium carbonate, 60-62 wt % of 350 mesh calcium carbonate, 18-20 wt % of PVC resin powder, 2.3-2.7 wt % of the foaming regulator, 2.6-2.8 wt % of the stabilizer, 0.15-0.18 wt % of the plasticizer, 0.10-0.15 wt % of the external lubricant, 0.13-0.29 wt % of the ADC foaming agent, and 0.54-0.70 wt % of the NC foaming agent, based on the total weight of the core flooring.

10. A light-foamed SPC floor comprising the core flooring of claim 1 as its core flooring layer.

11. The light-foamed SPC floor according to claim 10, wherein the light-foamed SPC floor further comprises one or more of a wear layer, a decor layer, a bottom layer and UV coating.

12. The light-foamed SPC floor according to claim 11, wherein:
the bottom layer of the light-foamed SPC floor is provided with a balancing layer, and a plastic Luxury Vinyl Tile (LVT) layer is used as the balancing layer;
the UV coating is provided on the surface of the wear layer.

13. The light-foamed SPC floor according to claim 12, wherein:
the plastic LVT bottom layer contains 43-48 wt % of PVC resin, 43-48 wt % of calcium carbonate, 1.0-1.5 wt % of a stabilizer, 7-9 wt % of a plasticizer, 0.10-0.20 wt % of an external lubricant, and 0.01-0.10 wt % of a colorant comprising carbon black based on the total weight of the plastic LVT bottom layer; or
the plastic LVT bottom layer contains 44-46 wt % of PVC resin, 44-46 wt % of calcium carbonate, 1.0-1.5 wt % of the stabilizer, 7.5-8.6 wt % of the plasticizer, 0.10-0.20 wt % of the external lubricant, and 0.01-0.06 wt % of the colorant comprising carbon black, based on the total weight of plastic LVT bottom layer.

14. The light-foamed SPC floor according to claim 12, wherein:
the core flooring contains 10-12 wt % of 800 mesh calcium carbonate, 57-59 wt % of 350 mesh calcium carbonate, 23-24.5 wt % of PVC resin powder, 2.8-3.1 wt % of the foaming regulator, 2.9-3.2 wt % of the stabilizer, 0.15-0.18 wt % of the plasticizer, 0.10-0.15 wt % of the external lubricant, 0.1-0.2 5wt % of the ADC foaming agent, and 0.50-0.60 wt % of the NC foaming agent, based on the total weight of the core flooring; or the core flooring contains 11-13 wt % of 800 mesh calcium carbonate, 60-62 wt % of 350 mesh calcium carbonate, 18-20 wt % of PVC resin powder, 2.3-2.7 wt % of the foaming regulator, 2.6-2.8 wt % of the stabilizer, 0.15-0.18 wt % of the plasticizer, 0.10-0.15 wt % of the external lubricant, 0.1-0.29 wt % of the ADC foaming agent, and 0.54-0.70 wt % of the NC foaming agent, based on the total weight of the core flooring.

* * * * *